United States Patent
Eom et al.

(10) Patent No.: US 12,428,742 B2
(45) Date of Patent: Sep. 30, 2025

(54) ELECTRODE FOR ELECTROLYSIS

(71) Applicant: LG Chem, Ltd., Seoul (KR)

(72) Inventors: Hee Jun Eom, Daejeon (KR); Yeon Yi Kim, Daejeon (KR); Myung Hun Kim, Daejeon (KR); Dong Chul Lee, Daejeon (KR); Sang Yun Jung, Daejeon (KR); Gyo Hyun Hwang, Daejeon (KR); Jong Wook Jung, Daejeon (KR); Yong Ju Bang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 328 days.

(21) Appl. No.: 17/311,850

(22) PCT Filed: Feb. 17, 2020

(86) PCT No.: PCT/KR2020/002241
§ 371 (c)(1),
(2) Date: Jun. 8, 2021

(87) PCT Pub. No.: WO2020/171509
PCT Pub. Date: Aug. 27, 2020

(65) Prior Publication Data
US 2022/0018032 A1    Jan. 20, 2022

(30) Foreign Application Priority Data
Feb. 22, 2019 (KR) .................. 10-2019-0021361

(51) Int. Cl.
*C25B 11/052* (2021.01)
*C25B 1/34* (2006.01)
(Continued)

(52) U.S. Cl.
CPC .............. *C25B 11/052* (2021.01); *C25B 1/34* (2013.01); *C25B 11/03* (2013.01); *C25B 11/061* (2021.01); *C25B 11/093* (2021.01); *C25B 11/095* (2021.01)

(58) Field of Classification Search
None
See application file for complete search history.

(56) References Cited

U.S. PATENT DOCUMENTS 6,017,430 A    1/2000  Hodgson et al.
6,139,705 A   10/2000  Brown, Jr. et al.
(Continued)

FOREIGN PATENT DOCUMENTS

CN    1764743 A     4/2006
CN    102260878 A  11/2011
(Continued)

OTHER PUBLICATIONS

Peng et al ("Flexible fiber/wire-shaped solar cells in progress: properties, materials, and designs", Journal of Materials Chemistry A, 2015, 3, pp. 20435-20458) (Year: 2015).*
(Continued)

*Primary Examiner* — Alexander W Keeling
(74) *Attorney, Agent, or Firm* — Lerner David LLP

(57) ABSTRACT

The present invention provides an electrode for electrolysis in which a planarized metal substrate having a mesh structure such that the aspect ratio of an individual cross-section of a wire constituting the mesh structure is 120% or greater is used to increase the surface area of a coating layer, thereby increasing adhesion to a membrane and gas trap is reduced to reduce overvoltage.

8 Claims, 3 Drawing Sheets

(51) Int. Cl.
  *C25B 11/03* (2021.01)
  *C25B 11/061* (2021.01)
  *C25B 11/093* (2021.01)
  *C25B 11/095* (2021.01)

(56) References Cited

U.S. PATENT DOCUMENTS

| | | |
|---|---|---|
| 7,323,090 B2 | 1/2008 | Houda et al. |
| 7,704,355 B2 | 4/2010 | Meneghini |
| 2003/0019760 A1 | 1/2003 | Hardee et al. |
| 2004/0188247 A1 | 9/2004 | Hardee |
| 2005/0000798 A1 | 1/2005 | Faita et al. |
| 2006/0042935 A1 | 3/2006 | Houda et al. |
| 2007/0289865 A1 | 12/2007 | DiFranco et al. |
| 2009/0223815 A1 | 9/2009 | Nara et al. |
| 2011/0290642 A1 | 12/2011 | Hayashida |
| 2012/0000789 A1 | 1/2012 | Turek et al. |
| 2015/0259811 A1* | 9/2015 | Takeuchi ............ C25B 11/03 427/125 |
| 2016/0115604 A1* | 4/2016 | Ivanov ............... C25B 11/02 204/280 |
| 2017/0198402 A1 | 7/2017 | Takeuchi |
| 2019/0360112 A1 | 11/2019 | Nishizawa et al. |
| 2020/0164346 A1* | 5/2020 | Jiang ................. B01J 23/6525 |
| 2021/0140058 A1 | 5/2021 | Eom et al. |

FOREIGN PATENT DOCUMENTS

| | | |
|---|---|---|
| CN | 107376896 A * | 11/2017 |
| EP | 3569740 A1 | 11/2019 |
| EP | 3575442 A1 | 12/2019 |
| EP | 3819402 A1 | 5/2021 |
| JP | 108269763 A | 10/1996 |
| JP | 2003277967 A | 10/2003 |
| JP | 2006193768 A | 7/2006 |
| JP | 2006299395 A | 11/2006 |
| JP | 2009215580 A | 9/2009 |
| JP | 2010037619 A | 2/2010 |
| JP | 4453973 B2 | 4/2010 |
| JP | 2015052145 A | 3/2015 |
| KR | 19980702132 A | 7/1998 |
| KR | 20010034837 A | 4/2001 |
| KR | 20050044403 A | 5/2005 |
| KR | 20070061851 A | 6/2007 |
| KR | 20150060978 A | 6/2015 |
| KR | 20170018893 A | 2/2017 |
| WO | WO-2015033989 A1 * | 3/2015 ............ C23C 18/06 |
| WO | 2018131519 A1 | 7/2018 |
| WO | 2018139610 A1 | 8/2018 |
| WO | 2019031753 A1 | 2/2019 |
| WO | 2020/009475 A1 | 1/2020 |

OTHER PUBLICATIONS

Hossain et al ("Fabrication and electrochemical study of ruthenium-ruthenium oxide/activated carbon nanocomposites for enhanced energy storage", Journal of Alloys and Compounds, vol. 751, Jun. 30, 2018, pp. 138-147) (Year: 2018).*
Pletcher et al ("A comparison of cathodes for zero gap alkaline water electrolysers for hydrogen production", International Journal of Hydrogen Energy, vol. 37, Issue 9, May 2012, pp. 7429-7435). (Year: 2012).*
Dexmet (Year: 2024).*
Liu et al ("Development of Ruthenium-Based Catalysts for Oxygen Reduction Reaction", Journal of the Electrochemical Society, 154, 2, A123-A128, 2007 (Year: 2007).*
Dexmet ("How Expanded Materials are Made", 2016). (Year: 2016).*
Ntainjua et al ("The influence of cerium to urea preparation ratio of nanocrystalline ceria catalysts for the total oxidation of naphthalene", Catalysis Today, 137 (2008) 373-378), (Year: 2008).*
Extended European Search Report for Application No. 20759250.2 dated Mar. 25, 2022. 7 pgs.
International Search Report for Application No. PCT/KR2020/002241, dated May 28, 2020, 4 pages.
Search Report dated Feb. 22, 2024 from the Office Action for Chinese Application No. 202080006868.6 Issued Feb. 23, 2024, pp. 1-2.

* cited by examiner

ELECTRODE FOR ELECTROLYSIS

CROSS-REFERENCE TO RELATED APPLICATIONS

The present application is a national phase entry under 35 U.S.C. § 371 of International Application No. PCT/KR2020/002241, filed on Feb. 17, 2020, which claims priority to Korean Patent Application No. 10-2019-0021361, filed on Feb. 22, 2019, the disclosures of which are incorporated herein in their entirety by reference.

TECHNICAL FIELD

The present invention relates to an electrode for electrolysis and a method for manufacturing the same, the electrode for electrolysis in which a metal substrate layer thereof is planarized and a method for manufacturing the electrode.

BACKGROUND ART

A technology of producing hydroxides, hydrogen, and chlorine by electrolyzing low-cost brine such as seawater is widely known. Such an electrolysis process is also referred to as a chlor-alkali process, the performance and reliability of which have been proven through decades of commercial operation.

As a method for electrolyzing brine, an ion exchange membrane method is currently most widely used, the method in which an ion exchange membrane is installed inside an electrolyzer to divide the electrolyzer into a cation chamber and an anion chamber, and using brine as an electrolyte, chlorine gas is obtained from an anode and hydrogen and caustic soda are obtained from a cathode.

Meanwhile, the electrolysis of brine is achieved through reactions as shown in the following electrochemical reaction formulae.

Reaction of anode: $2Cl^- \rightarrow Cl_2 + 2e^-$ ($E^0 = +1.36$ V)

Reaction of cathode: $2H_2O + 2e^- \rightarrow 2OH^- + H_2$ ($E^0 = 0.83$ V)

Entire reaction: $2Cl^- + 2H_2O \rightarrow 2OH^- + Cl_2 + H_2$ ($E^0 = -2.19$ V)

In performing the electrolysis of brine, the electrolytic voltage must be determined by taking the voltage theoretically required for the electrolysis of brine, the overvoltage of each of an anode and a cathode, the voltage by the resistance of an ion exchange membrane, and the voltage by distance between the anode and the cathode into account. Among the above voltages, the overvoltage by an electrode acts as an important variable.

Therefore, methods capable of reducing the overvoltage of an electrode have been studied. For example, as an anode, a precious metal electrode referred to as a dimensionally stable anode (DSA) has been developed and used, and as for a cathode, there has been also a demand for development of excellent materials which are low in overvoltage and durable.

As such a cathode, stainless steel or nickel has been mainly used. In recent years, in order to reduce overvoltage, methods in which the surface of stainless steel or nickel is coated with any one of a nickel oxide, an alloy of nickel and tin, a combination of activated carbon and an oxide, a ruthenium oxide, platinum, and the like have been studied. In addition, in order to increase the activity of a cathode by adjusting the composition of an active material, methods in which the composition is adjusted using a platinum group element such as ruthenium and a lanthanide element such as cerium have also been studied. However, there have been problems in which overvoltage occurs and deterioration caused by a reverse current occurs.

PRIOR ART DOCUMENT (Patent Document 1) JP2003-2977967A

DISCLOSURE OF THE INVENTION

Technical Problem

An aspect of the present invention provides an electrode for electrolysis having increased adhesion to a membrane and reduced gas trap, thereby having reduced overvoltage.

Technical Solution

According to an aspect of the present invention, there is provided an electrode for electrolysis including a metal substrate layer having a mesh structure and a coating layer including a ruthenium-based oxide, a cerium-based oxide, a platinum-based oxide, and an amine-based compound, wherein the coating layer is formed on the surface of a wire constituting the mesh structure, and an individual cross-section of the wire has an aspect ratio of 120% or greater.

According to another aspect of the present invention, there is provided a method for manufacturing an electrode for electrolysis, the method including planarizing a metal substrate having a mesh structure such that the aspect ratio of an individual cross-section of a wire constituting the mesh structure is 120% or greater, applying a coating composition on the surface of the wire of the planarized metal substrate, and performing coating by drying and firing the metal substrate applied with the coating composition, wherein the coating composition includes a ruthenium-based precursor, a cerium-based precursor, a platinum-based precursor, and an amine-based compound.

Advantageous Effects

An electrode for electrolysis according to the present invention has a metal substrate which has been planarized, thereby having high adhesion to a membrane, and accordingly, gas trap is reduced to allow effective gas desorption, so that overvoltage problem may be reduced.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

BEST MODE FOR CARRYING OUT THE INVENTION

Figure 1:
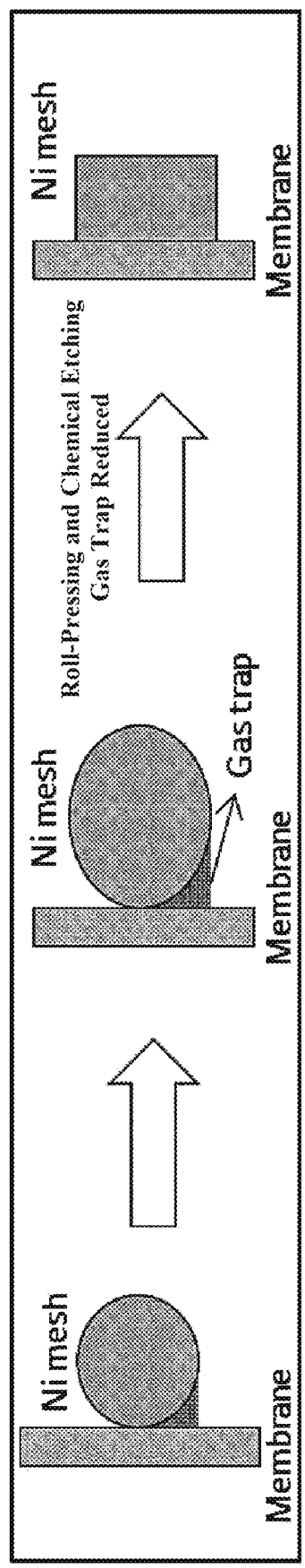
FIG. 1 is a diagram briefly showing an effect which may be achieved when a metal substrate is planarized in the present invention.

Hereinafter, the present invention will be described in more detail with reference to Examples and Experimental Examples. However, the present invention is not limited by these Examples and Experimental Examples. The embodiments according to the present invention may be modified into other various forms, and the scope of the present invention should not be construed as being limited to the embodiments described below. The embodiments of the present invention are provided to more fully describe the present invention to those skilled in the art.

Materials

In the present embodiment, a nickel substrate (Ni purity of 99% or greater, diameter of 200 μm, and thickness of 370 μm) manufactured by Ildong Keummangsa Co., Ltd. was used as a metal substrate, and ruthenium chloride hydrate of Heraeus Co., Ltd. was used as a ruthenium-based precursor. As a platinum-based precursor, platinum chloride (platinum (IV) chloride, 99.9%) of Alfa Aesar Co., Ltd. was used, and as a cerium-based precursor, cerium nitrate hexahydrate of Sigma-Aldrich Co., Ltd. was used. As an amine-based compound, urea of Daejung Chemicals & Metals was used. Also, as a solvent, isopropyl alcohol and 2-butoxy ethanol of Daejung Chemicals & Metals were used.

Preparing Coating Composition

Metal precursors $RuCl_3 \cdot nH_2O$, $Ce(NO_3)_3 \cdot 6H_2O$, and $PtCl_4$ were mixed in a molar ratio of 5:1:0.4 and then dissolved in a solvent in which isopropyl alcohol and 2-butoxy ethanol were mixed in a volume ratio of 1:1. Thereafter, when the metal precursors were dissolved, urea, which is an amine-based compound, was added thereto in a molar ratio of 3.13, stirred at 50° C. overnight to prepare a coating composition solution having a concentration of 100 g/L based on ruthenium.

EXAMPLES

Example 1. Manufacturing of Electrode for Electrolysis Using Nickel Substrate Planarized by Roll-Pressing The nickel substrate of the above material was roll-pressed to prepare a planarized nickel substrate having a thickness of 170 μm. The aspect ratio of a cross-section of an individual wire of the planarized nickel substrate was measured, and the value thereof was 120-169%. Thereafter, the surface of the substrate was sand-blasted with an aluminum oxide (120 mesh) under the condition of 0.4 MPa to be processed into a structure having irregularities. Thereafter, the processed nickel substrate was placed into a $H_2SO_4$ aqueous solution of 5M at 80° C. and processed for 3 minutes to complete a pretreatment process. Thereafter, the pre-treated nickel substrate was coated with the coating composition solution prepared above by brushing, dried in a convection-type drying oven of 180° C. for 10 minutes, and then placed in an electric heating furnace of 500° C. to be fired for 10 minutes. The above coating, drying, and firing steps were performed for 9 more times, and finally, firing was performed for 1 hour in an electric heating furnace heated to 500° C. to manufacture an electrode for electrolysis.

Example 2. Manufacturing of Electrode for Electrolysis Using Nickel Substrate Planarized by Chemical Etching An electrode for electrolysis was manufactured in the same manner as in Example 1 except that chemical etching was performed instead of roll-pressing. The aspect ratio of a cross-section of an individual wire of the planarized nickel substrate was measured, and the value thereof was 132-155%.

Example 3. Manufacturing of Electrode for Electrolysis Using Nickel Substrate Planarized by Pressing An electrode for electrolysis was manufactured in the same manner as in Example 1 except that pressing was performed instead of roll-pressing. However, in the case in which a pressing treatment was performed, planarizing was not uniformly achieved compared to cases in which planarizing was performed by other methods. However, the aspect ratio value thereof was 120-180%, which was confirmed to be greater than the cases in which planarizing was performed by other methods.

Comparative Example 1. Commercial Electrode

After the voltage stabilization of a fresh electrode was completed through an electrolysis process, the fresh electrode was activated and used as a commercial electrode of Comparative Example 1.

Comparative Example 2. Manufacturing of Electrode for Electrolysis Using Nickel Substrate not Planarized An electrode for electrolysis was manufactured in the same manner as in Example 1 except that planarizing was not performed. The aspect ratio of a cross-section of an individual wire of the nickel substrate not planarized was 100%.

Comparative Examples 3. Manufacturing of Electrode for Electrolysis Using Nickel Substrate not Planarized and Thin An electrode for electrolysis was manufactured in the same manner as in Example 1 except that a nickel substrate having a thickness of 170 μm and not planarized was used. The aspect ratio of a cross-section of an individual wire of the nickel substrate not planarized was 100%.

The information on the electrode manufactured in each of Examples 1 to 3 and Comparative Examples 1 to 3 is summarized in Table 1.

TABLE 1

| Classification | Example 1 | Example 2 | Example 3 | Comparative Example 1 | Comparative Example 2 | Comparative Example 3 |
| --- | --- | --- | --- | --- | --- | --- |
| Planarizing method | Roll-pressing | Chemical etching | Pressing | — | — | — |
| Aspect ratio | 120-169% | 132-155% | 120-180% | 100% | 100% | 100% |
| Thickness of substrate (μm) | 170 | 180 | 160 | 330 | 380 | 170 |
| Composition ratio of coating layer (Ru:Ce:Pt:Urea) | 5:1:0.4:3.13 | 5:1:0.4:3.13 | 5:1:0.4:3.13 | 5:1:0.4:3.13 | 5:1:0.4:3.13 | 5:1:0.4:3.13 |

Figure 2:
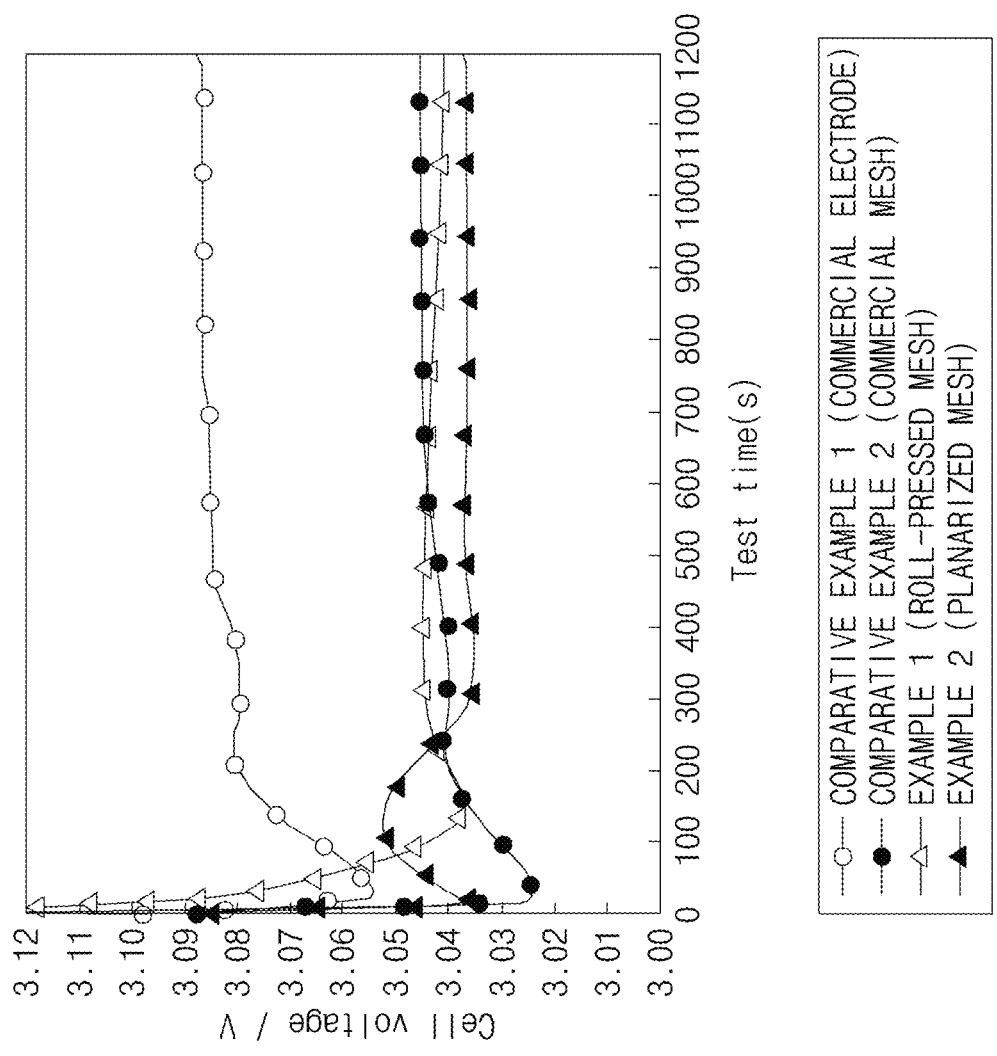
FIG. 2 is a graph showing changes in performance over time of the electrode of each of Examples 1-2 and Comparative Examples 1-2 of the present invention.

Experimental Example 1. Confirmation of Performance of Manufactured Electrode for Electrolysis In order to confirm the performance of the electrode manufactured in each of Examples 1 to 3 and Comparative Examples 1 to 3, a single cell apparatus for measuring overvoltage at a constant current was used. The measurement was conducted by using an oxidation electrode of AKC Co., Ltd, which is a commercial electrode, as an oxidation electrode (anode), and using a 5×5 $cm^2$ cell as a reduction electrode (cathode), the cell which is capable of implementing a zero gap cell in the form in which a nickel mattress is placed on a current meter and an electrode is placed thereon. The experiment was performed under the conditions of using F6808 from Aciplex Co., Ltd. as a membrane and using a current having a current density of 6.2 $kA/m^2$ as a constant current. A cathode voltage measurement experiment using a half-cell in brine electrolysis (Chlor-Alkali Electrolysis) was performed. 305 g/L sodium chloride was used as an electrolyte of the oxidation electrode, and 30.6% sodium hydroxide was used as an electrolyte of the reduction electrode. The experiment was performed by setting a reaction temperature to 90° C. and flowing for both the oxidation electrode and the reduction electrode at a flow rate of 15 ml/min. The results are summarized in Table 2 below, and changes over time are shown in FIG. 2.

TABLE 2

| | Example 1 | Example 2 | Example 3 | Comparative Example 1 | Comparative Example 2 | Comparative Example 3 |
|---|---|---|---|---|---|---|
| Performance (V) | 3.040 | 3.035 | 3.043 | 3.086 | 3.045 | 3.126 |

As confirmed in Table 2 above, it was confirmed that the electrodes of Examples which were planarized, thereby having an aspect ratio of 110% or greater, showed lower overvoltage than the electrodes of Comparative Examples which were not planarized. In addition, as confirmed in FIG. 2, the electrode of Comparative Example 1 showed high overvoltage from the beginning, and the electrodes of Examples 1 and 2 showed lower values than the electrode of Comparative Example 2 in terms of an overvoltage value converging after a predetermined period of time.

Experimental Example 2. Observation of Electrode Surface

Figure 3:
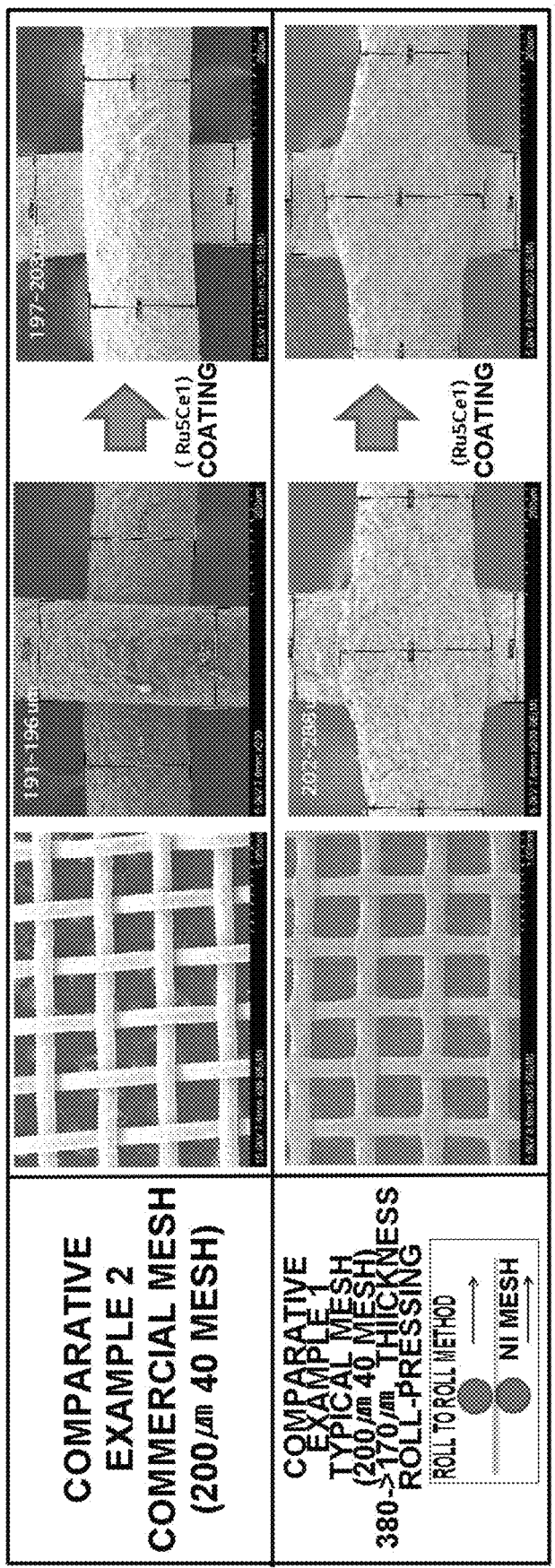
FIG. 3 is a diagram showing the surface of the electrode of each of Example 1 and Comparative Example 2 of the present invention.

The surfaces of the electrodes manufactured in Example 1 and Comparative Example 2 were observed and the results are shown in FIG. 3. The observation was performed by Scanning Electron Microscope (SEM). From FIG. 3, it was confirmed that when roll-pressing was performed, wires intersection in a mesh structure came into contact in a large area, and accordingly, a coating layer of a wider area was secured. That is, the electrolysis reaction was more smoothly performed on the electrode of Example 1 than on that of Comparative Example 2.

MODE FOR CARRYING OUT THE INVENTION

Hereinafter, the present invention will be described in more detail.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

Definition of Term

"Aspect ratio" as used herein refers to the ratio of width to height (width/height).

"Mesh structure" as used herein refers to the mesh structure formed by wires entangled with each other.

Electrode for Electrolysis Reaction

The present invention provides an electrode for electrolysis including a metal substrate layer having a mesh structure and a coating layer including a ruthenium-based oxide, a cerium-based oxide, a platinum-based oxide, and an amine-based compound, wherein the coating layer is formed on the surface of a wire constituting the mesh structure, and an individual cross-section of the wire has an aspect ratio of 120% or greater.

The metal substrate may be nickel, titanium, tantalum, aluminum, hafnium, zirconium, molybdenum, tungsten, stainless steel or an alloy thereof. Among the above, nickel is preferable. When nickel is used as the metal substrate, an electrode may be excellent in durability and performance.

As for the metal substrate included in the electrode for electrolysis reaction, individual wires constituting the mesh structure thereof are processed to be flattened, so that the aspect ratio of each wire cross-section is 120% or more. Preferably, the lower limit value of the aspect ratio may be 120%, 125%, or 130%, and the upper limit value of the aspect ratio may be 180%, 170%, 160%, or 150%. As can be seen in FIG. 1, when a metal substrate having a mesh structure is planarized such that the aspect ratio of a cross-section of an individual wire constituting the mesh structure is 120% or greater, adhesion to a membrane is increased, thereby reducing gas trap, and as a result, overvoltage may be reduced and an electrolysis reaction may be smoothly performed. Meanwhile, when the aspect ratio is excessively large, there may be a problem in that the durability of the metal substrate itself is decreased. The planarizing may be performed by any method without limitation as long as it is a method allowing the aspect ratio of a cross-section of an individual wire constituting the mesh structure to be 120% or greater without affecting the durability of the metal substrate, and may be preferably performed by pressing, roll-pressing, or chemical etching.

The ruthenium-based oxide, cerium-based oxide, and platinum-based oxide of the coating layer serve to reduce the overvoltage of the electrode, and in particular, the platinum-based oxide may improve the stability of a catalyst layer for further reducing overvoltage, and the cerium-based oxide may improve the durability and stability of the catalyst layer.

The thickness of the metal substrate may be 100-300 μm, preferably 120-280 μm, and more preferably 150-250 μm. When the metal substrate is too thin, for example, thinner than 100 μm, the durability of the electrode is poor, so that the use of the electrode may be problematic. When the metal substrate is too thick, for example, thicker than 300 μm, a large amount of cost is consumed for the manufacturing of the electrode. When a metal substrate of a thick mesh structure is used, the hardness of the substrate is high so that the adhesion between an electrode and a membrane is reduced in a zero-gap cell. Thus, an electrolysis reaction may not be smoothly performed.

Method for Manufacturing Electrode for Electrolysis

The present invention provides a method for manufacturing an electrode for electrolysis, the method including planarizing a metal substrate having a mesh structure such that the aspect ratio of an individual cross-section of a wire constituting the mesh structure is 120% or greater, applying a coating composition on the surface of the wire of the planarized metal substrate, and performing coating by drying and firing the metal substrate applied with the coating composition, wherein the coating composition includes a ruthenium-based precursor, a cerium-based precursor, a platinum-based precursor, and an amine-based compound.

The planarizing may be performed by the above-described method, and may be preferably performed through roll-pressing or chemical etching.

The ruthenium-based precursor is a material for providing ruthenium, which is an active material, to a catalyst layer of a cathode for electrolysis. The ruthenium-based precursor may be one or more selected from the group consisting of ruthenium hexafluoride ($RuF_6$), ruthenium (III) chloride ($RuCl_3$), ruthenium (III) chloride hydrate ($RuCl_3 \cdot xH_2O$), ruthenium (III) bromide ($RuBr_3$), ruthenium (III) bromide hydrate ($RuBr_3 \cdot xH_2O$), ruthenium (III) iodide ($RuI_3$), and acetic acid ruthenium salt. Among the above, ruthenium (III) chloride hydrate is preferable.

The cerium-based precursor is a material for providing a cerium element to a catalyst layer of a cathode for electrolysis. The cerium element improves the durability of the cathode for electrolysis, and thus, may minimize the loss of ruthenium in the catalyst layer of an electrode for electrolysis during activation or electrolysis. Specifically, during the activation or electrolysis of the cathode for electrolysis, particles containing ruthenium in the catalyst layer are not changed in structure and become metallic ruthenium (Ru) or partially hydrated and reduced to active species. Also, particles containing the cerium element in the catalyst layer are changed in structure and form a network with the particles containing ruthenium in the catalyst layer. As a result, the durability of the cathode for electrolysis is improved, thereby preventing the loss of ruthenium in the catalyst layer.

The cerium-based precursor is one or more selected from the group consisting of cerium (III) nitrate hexahydrate ($Ce(NO_3)_3 \cdot 6H_2O$), cerium (IV) sulfate tetrahydrate ($Ce(SO_4)_2 \cdot 4H_2O$), and cerium (III) chloride heptahydrate ($CeCl_3 \cdot 7H_2O$). Among the above, cerium (III) nitrate hexahydrate is preferable.

A catalyst composition may include the cerium-based precursor in an amount of 0.01-0.5 mole or 0.05-0.35 mole based on 1 mole of the ruthenium-based precursor. Among the above, it is preferable that the cerium-based precursor is included in an amount of 0.05-0.35 mole.

When the above-mentioned range is satisfied, the durability of an electrode to be manufactured is improved, so that it is possible to minimize the loss of ruthenium in the catalyst layer during activation or electrolysis.

The platinum-based precursor is a material for providing platinum to a catalyst layer of a cathode for electrolysis. The platinum may reduce an overvoltage phenomenon of an electrode. In addition, the platinum may minimize the variation of the initial performance of the electrode and the performance after a predetermined period of time has elapsed. As a result, the performance of a separate activation process on the electrode may be prevented or minimized.

The platinum-based precursor may be one or more selected from the group consisting of chloroplatinic acid hexahydrate ($H_2PtCl_6 \cdot 6H_2O$), diamine dinitro platinum ($Pt(NH_3)_2(NO_2)_2$), platinum (IV) chloride ($PtCl_4$), platinum (II) chloride ($PtCl_2$), potassium tetrachloroplatinate ($K_2PtCl_4$), and potassium hexachloroplatinate ($K_2PtCl_6$). Among the above, platinum (IV) chloride is preferable.

The catalyst composition may include the platinum-based precursor in an amount of 0.01-0.7 mole or 0.02-0.5 mole based on 1 mole of the ruthenium-based precursor. Among the above, it is preferable that the platinum-based precursor is included in an amount of 0.02-0.5 mole.

When the above-mentioned range is satisfied, the overvoltage phenomenon of the electrode, may be significantly reduced. In addition, since the initial performance of the electrode for electrolysis and the performance thereof after a predetermined period of time has elapsed may be maintained to be constant, an activation process of the electrode is not required. Accordingly, the time and cost consumed for the activation process of the electrode may be reduced.

The amine-based compound is known to serve to making a particle phase small by being injected as an additive when preparing nano particles and the like, and also has an effect of making a ruthenium oxide crystalline phase small when coating an electrode. In addition, when the catalyst composition includes an amine compound, the cerium network structure formed by increasing the size of the acicular structure of cerium serves to fix ruthenium particles more firmly, thereby improving the durability of the electrode. Also, as a result, there is an effect of significantly reducing a peeling phenomenon of the electrode even when the electrode is operated for a long time.

The catalyst composition may include the amine-based precursor in an amount of 0.5-1 mole or 0.6-0.9 mole based on 1 mole of the ruthenium-based precursor. Among the above, it is preferable that the amine-based precursor is included in an amount of 0.6-0.9 mole.

When the above-mentioned content is satisfied, the amine-based compound may change the structure of particles containing a cerium element faster after the activation of the electrode or during electrolysis than when the amine-based compound is not used, thereby forming a network in the catalyst layer, and thus, improving the durability of the electrode. Specifically, the amine-based compound may improve the durability of the electrode by increasing the acicular structure of particles containing cerium.

It is preferable that the amine compound is urea. When urea is used, the stability and safety of a coating solution are better than when other amine-based compounds are used. Also, there is an advantage of reducing the generation of harmful substances and odors even when the electrode is manufactured on a large scale.

In the manufacturing method of the present invention, a step of pre-treating the metal substrate may be include before performing the coating step.

The pre-treatment may be performing chemical etching, blasting or thermal spraying on a metal substrate to form irregularities on the surface of the metal substrate.

The pre-treatment may be performed by sand blasting the surface of a metal substrate to form fine irregularities, followed by salt treatment or acid treatment. For example, the pre-treatment may be performed by forming irregularities on the surface of a metal substrate by sand blasting the surface with alumina, immersing the surface in a sulfuric acid aqueous solution, and then washing and drying the surface to form fine irregularities thereon.

The applying is not particularly limited as long as the catalyst composition is evenly applied on a metal substrate, and may be performed by a method known in the art.

The applying may be performed by any one method selected from the group consisting of doctor blade, die casting, comma coating, screen printing, spray spraying, electrospinning, roll coating, and brushing.

The drying may be performed for 5-60 minutes at 50-300° C., and it is preferable that the drying is performed for 5-20 minutes at 50-200° C.

When the above conditions are met, a solvent may be sufficiently removed and energy consumption may be reduced to the minimum.

The firing may be performed for one hour or less at 400-600° C., and it is preferable that the firing is performed for 5-30 minutes at 450-550° C.

The firing serves to convert a metal precursor to an oxide. When the firing satisfies the above-described conditions, the strength of the metal substrate may not be affected while impurities in the catalyst layer are easily removed.

Meanwhile, the coating may be performed by sequentially repeating the applying, drying and firing such that the catalyst composition is 10 g or greater based on ruthenium per unit area (m2) of a metal substrate. That is, in the manufacturing method according to another embodiment of the present invention, after applying, drying and heat treating the active layer composition on at least one surface of a metal substrate, coating of applying, drying and firing the catalyst composition may be repeatedly performed on the one surface of the metal substrate applied with the catalyst composition for the first time. The coating may be performed repeatedly for 5 times to 20 times.

The invention claimed is:

1. An electrode for electrolysis comprising:
    a metal substrate layer having a mesh structure; and
    a coating layer having a composition ratio that includes a ruthenium-based oxide, a cerium-based oxide, a platinum-based oxide, and an amine-based compound, respectively, wherein the coating layer is formed on the surface of a planarized wire constituting the mesh structure, and the metal substrate layer is a planarized metal substrate layer forming an individual cross-section of the wire with an aspect ratio of from 130% to 150%,
    wherein the cross-section is perpendicular to a length direction of the wire, and
    wherein the amine-based compound is urea, and
    the composition ratio including:
        the cerium-based oxide in an amount of 0.05-0.35 mole based on 1 mole of the ruthenium-based oxide;
        the platinum-based oxide in an amount of 0.02-0.5 mole based on 1 mole of the ruthenium-based oxide; and
        the amine-based compound in an amount of 0.6-0.9 mole based on 1 mole of the ruthenium-based oxide, respectively;
    wherein the electrode is a cathode and the electrode has improved durability with the composition ratio as compared to without the composition ratio; and
    wherein the planarized metal substrate has a higher adhesion to the coating layer, and a reduced gas trap to allow effective gas desorption for reduced overvoltage as compared to non-planarized metal substrate having similar substrate thickness, and metal substrate composition.

2. The electrode for electrolysis of claim 1, wherein a metal of the metal substrate layer is one of nickel, titanium, tantalum, aluminum, hafnium, zirconium, molybdenum, tungsten, stainless steel, or an alloy thereof.

3. The electrode for electrolysis of claim 1, wherein a thickness of the metal substrate layer is 100-300 μm.

4. A method for manufacturing an electrode for electrolysis, comprising:
    planarizing a metal substrate for forming a planarized metal substrate having a mesh structure such that an aspect ratio of an individual cross-section of a wire constituting the mesh structure is from 130% to 150%;
    applying a coating composition on a surface of the wire of the planarized metal substrate; and
    performing coating by drying and firing the metal substrate applied with the coating composition,
    wherein the coating composition has a composition ratio that includes a ruthenium-based precursor, a cerium-based precursor, a platinum-based precursor, and an amine-based precursor, the composition ratio including:
        the cerium-based precursor in an amount of 0.05-0.35 mole based on 1 mole of the ruthenium-based precursor;
        the platinum-based precursor in an amount of 0.02-0.5 mole based on 1 mole of the ruthenium-based precursor; and
        the amine-based precursor in an amount of 0.6-0.9 mole based on 1 mole of the ruthenium-based precursor, respectively;
    wherein the amine-based precursor is urea,
    wherein the electrode is a cathode; and the electrode has improved durability with the composition ratio as compared to without the composition ratio; and
    wherein the planarized metal substrate has a higher adhesion to the coating composition, and a reduced gas trap to allow effective gas desorption for reduced overvoltage as compared to non-planarized metal substrate having similar substrate thickness, and metal substrate composition.

5. The method of claim 4, wherein the planarizing is performed by roll-pressing or chemical etching.

6. The method of claim 4, wherein the metal substrate is a nickel substrate.

7. The method of claim 4, wherein
    the ruthenium-based precursor is one or more selected from the group consisting of ruthenium hexafluoride ($ruf_6$), ruthenium (III) chloride ($rucl_3$), ruthenium (III) chloride hydrate ($rucl_3 \cdot xh_2o$), ruthenium (III) bromide ($rubr_3$), ruthenium (III) bromide hydrate ($rubr_3 \cdot xh_2o$), ruthenium (III) iodide ($rui_3$), and acetic acid ruthenium salt,
    the cerium-based precursor is one or more selected from the group consisting of cerium (III) nitrate hexahydrate ($Ce(NO_3)_3 \cdot 6H_2O$), cerium (IV) sulfate tetrahydrate ($Ce(SO_4)_2 \cdot 4H_2O$), and cerium (III) chloride heptahydrate ($cecl_3 \cdot 7H_2O$), and
    the platinum-based precursor is one or more selected from the group consisting of chloroplatinic acid hexahydrate ($h_2ptcl_6 \cdot 6H_2O$), diamine dinitro platinum ($Pt(NH_3)_2(NO)_2$), platinum (IV) chloride ($ptcl_4$), platinum (II) chloride ($ptcl_2$), potassium tetrachloroplatinate ($k_2ptcl_4$), and potassium hexachloroplatinate ($k_2ptcl_6$).

8. The method of claim 4, wherein the applying, drying, and firing are each performed 5-20 times, repeatedly.

* * * * *